(12) United States Patent
Han et al.

(10) Patent No.: US 11,395,119 B2
(45) Date of Patent: Jul. 19, 2022

(54) WIRELESS BATTERY MANAGEMENT SYSTEM FOR VEHICLE

(71) Applicant: LG ELECTRONICS INC., Seoul (KR)

(72) Inventors: Munyong Han, Seoul (KR); Jaewook Lee, Seoul (KR); Woonsuk Chang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/255,812

(22) PCT Filed: Sep. 6, 2019

(86) PCT No.: PCT/KR2019/011549
§ 371 (c)(1),
(2) Date: Dec. 23, 2020

(87) PCT Pub. No.: WO2020/055046
PCT Pub. Date: Mar. 19, 2020

(65) Prior Publication Data
US 2021/0281988 A1    Sep. 9, 2021

Related U.S. Application Data

(60) Provisional application No. 62/774,313, filed on Dec. 2, 2018, provisional application No. 62/731,026, filed on Sep. 13, 2018.

(51) Int. Cl.
*H04B 7/00*        (2006.01)
*H04W 4/48*       (2018.01)
(Continued)

(52) U.S. Cl.
CPC .............. *H04W 4/48* (2018.02); *B60L 58/10* (2019.02); *H04W 8/005* (2013.01)

(58) Field of Classification Search
CPC .......... H04W 4/48; H04W 8/005; B60L 58/10
(Continued)

(56) References Cited

U.S. PATENT DOCUMENTS 7,904,113 B2* 3/2011 Ozluturk ................. A61P 31/12
                                                                455/566
8,965,284 B2* 2/2015 Honkanen ............... H04W 4/80
                                                                455/41.1
(Continued)

FOREIGN PATENT DOCUMENTS

DE    10 2014 210 178 A1    12/2015
DE       102016102663 A1     8/2016
(Continued)

*Primary Examiner* — April G Gonzales
(74) *Attorney, Agent, or Firm* — Birch, Stewart, Kolasch & Birch, LLP

(57) ABSTRACT

In order to achieve the purpose and benefits of the present invention, a wireless battery management system for a vehicle according to embodiments of the present invention includes: one or more cell module control (CMC) units respectively including wireless communication modules; and a battery master control (BMC) unit which is wirelessly connected to the wireless communication modules of the one or more cell module control units and manages the one or more cell module control units, wherein the battery master control unit transmits advertisement data set for the one or more cell module control units, the one or more cell module control units transmit scan request data to the battery master control unit in response to the set advertisement data, the battery master control unit transmits scan response data to the one or more cell module control units in response to the scan request data, and the set advertisement data includes wireless resource allocation information for transmitting the next advertisement data.

9 Claims, 26 Drawing Sheets

(51) Int. Cl.
*B60L 58/10* (2019.01)
*H04W 8/00* (2009.01)

(58) Field of Classification Search
USPC ........................................................ 455/41.2
See application file for complete search history.

(56) References Cited

U.S. PATENT DOCUMENTS

| | | | |
|---|---|---|---|
| 2013/0288600 A1* | 10/2013 | Kuusilinna | H02J 7/00047 |
| | | | 455/41.2 |
| 2014/0266779 A1 | 9/2014 | Grothaus et al. | |
| 2015/0201455 A1* | 7/2015 | Redding | H04W 76/28 |
| | | | 455/41.2 |
| 2015/0230285 A1 | 8/2015 | Park et al. | |
| 2016/0021488 A1* | 1/2016 | Viswanadham | H04W 8/005 |
| | | | 455/41.2 |
| 2016/0212147 A1 | 7/2016 | Palin et al. | |

FOREIGN PATENT DOCUMENTS

| | | |
|---|---|---|
| EP | 2 211 193 A1 | 7/2010 |
| GB | 2 453 207 A | 4/2009 |
| KR | 10-2014-0073949 A | 6/2014 |
| KR | 10-1551720 B1 | 9/2015 |
| KR | 10-2016-0090374 A | 7/2016 |
| KR | 10-2017-0038825 A | 4/2017 |
| KR | 10-1783311 B1 | 9/2017 |
| KR | 10-2001366 B1 | 7/2019 |
| KR | 10-2144021 B1 | 8/2020 |
| WO | WO 2012/030455 A2 | 3/2012 |
| WO | WO 2013/133555 A1 | 9/2013 |
| WO | WO 2015/137601 A1 | 9/2015 |
| WO | WO 2015/179629 A1 | 11/2015 |
| WO | WO 2017/115091 A1 | 7/2017 |

* cited by examiner

FIG. 7
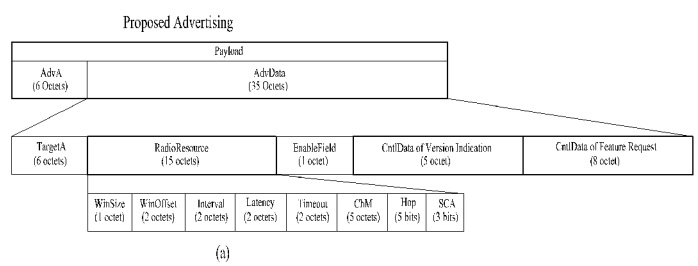
(a)
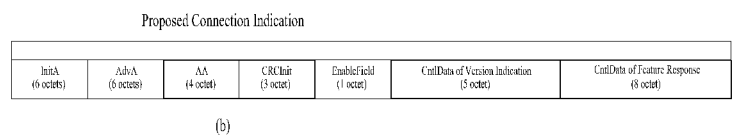
(b)

FIG. 10B

| Message format | Standard | Proposal # (Single-Device) |
|---|---|---|
| Version Indication | CtrData: VersNr (1 octet), CompId (2 octets), SubVersNr (2 octets)<br>Figure 2.35: CtrData field of the LL_VERSION_IND PDU | N/A |
| Feature Request/ Response | CtrData: FeatureSet (8 octets)<br>Figure 2.33: CtrData field of the LL_FEATURE_REQ PDU | N/A |
| Encryption Request | CtrData: Rand (8 octets), EDIV (2 octets), SKDm (8 octets), IVm (4 octets)<br>Figure 2.30: CtrData field of the LL_ENC_REQ PDU | N/A |
| Encryption Response | CtrData: SKDs (8 octets), IVs (4 octets)<br>Figure 2.31: CtrData field of the LL_ENC_RSP PDU | N/A |

FIG. 13
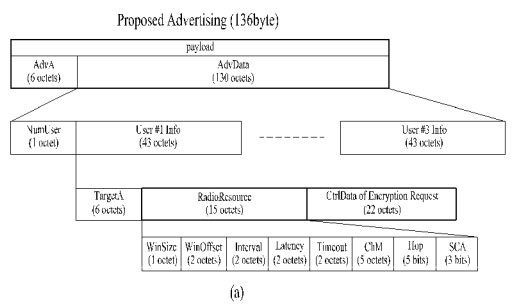
(a)
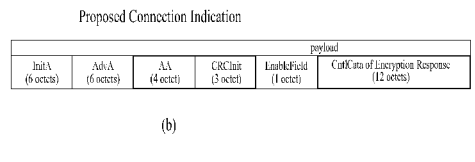
(b)

FIG. 15

| Message format | Proposal #1 (Single-Device) | Proposal #2 (Multi-Device) |
|---|---|---|
| Advertising (Normal Connection) | payload: AdvA (6 Octets), AdvData (44 Octets)<br>AdvData → TargetA (6 octets), RadioResource (15 octets), EnableField (1 octet), Parameter Field (22 octets)<br>Parameter Field → WinSize (1 octet), WinOffset (2 octets), Interval (2 octets), Latency (2 octets), Timeout (2 octets), ChM (5 octets), Hop (5 bits), SCA (3 bits)<br>Parameter Field Option 1: CtrlData of Encryption Request (22 octets)<br>Parameter Field Option 2: CtrlData of Version Indication (5 octets), CtrlData of Feature Request (8 octets)<br>Use of Parameter Field Option 1 | payload: AdvA (6 Octets), AdvData (130 Octets)<br>AdvData → TargetA (6 octets), NumUser (1 octet), User #1 Info (43 octets), ---- User #3 Info (43 octets)<br>RadioResource (15 octets), CtrlData of Encryption Request (22 octets) |
| Connection Indication | payload: InitA (6 octets), AdvA (6 octets), AA (4 octet), CRCInit (3 octet), EnableField (1 octet), Parameter Field (13 octets)<br>Parameter Field Option 1: CtrlData of Encryption Response (12 octets)<br>Parameter Field Option 2: CtrlData of Version Indication (5 octets), CtrlData of Feature Response (8 octets) | Identical to Single Device |

FIG. 21

| Master Payload | | | | |
|---|---|---|---|---|
| AdvA (6 bytes) | ChMap (4 bits) | Length (4 bits) | Slave List (varies) | AdvData (0~100 bytes) |

(a)

| Slave Payload | |
|---|---|
| AdvA (6 bytes) | AdvData (0~100 bytes) |

(b)

WIRELESS BATTERY MANAGEMENT SYSTEM FOR VEHICLE

CROSS-REFERENCE TO RELATED APPLICATIONS

This application is the National Phase of PCT International Application No. PCT/KR2019/011549, filed on Sep. 6, 2019, which claims priority under 35 U.S.C. 119(e) to U.S. Provisional Application Nos. 62/731,026, filed on Sep. 13, 2018, and 62/774,313 filed on Dec. 2, 2018, all of these applications are hereby expressly incorporated by reference into the present application.

TECHNICAL FIELD

The present disclosure relates to a wireless battery management system for vehicles configured to manage at least one vehicle battery based on wireless communications. More particularly, the present disclosure relates to a wireless battery management system for vehicles capable of reducing a wireless connection time by simplifying a wireless connection procedure between batteries.

BACKGROUND ART

A battery management system (BMS) refers to a system for monitoring the state of a battery to maintain and use the battery under optimum conditions.

The BMS may use each sensor connected to a battery cell to measure the temperature, current, voltage, etc. of the battery. In addition, the BMS may perform various work such as automatic control of a battery system, accurate detection of a remaining battery level, anticipation of a battery replacement time, detection of a wrong battery, etc.

In general, a wired battery connection method has been used for the BMS applied to vehicles. However, with recent development of a vehicle system based on Internet of Things (IoT), vehicle system requirements have increased, and flexibility in the mechanical design of a high-density battery pack has been required. Accordingly, a technology for wirelessly connecting battery packs has been needed.

Further, a connection procedure between batteries of the BMS based on wireless communications needs to be simplified to reduce a time required to start data transmission and reception after a vehicle is started.

DISCLOSURE

Technical Problem

One object of the present disclosure is to provide a wireless battery management system for vehicles based on wireless communications.

Another object of the present disclosure is to provide a wireless battery management system for vehicles capable of reducing a wireless connection time by simplifying a connection procedure between a battery master controller (BMC) and a cell module controller (CMC).

Technical Solution

To achieve these objects and other advantages and in accordance with the purpose of the disclosure, a wireless battery management system for vehicles is provided. The wireless battery management system may include at least one cell module controller (CMC) having a wireless communication module and a battery master controller (BMC) wirelessly connected to the wireless communication module of the at least one CMC and configured to manage the at least one CMC. The BMC may be configured to transmit Advertising data configured for the at least one CMC. The at least one CMC may be configured to transmit Scan Request data to the BMC in response to the configured Advertising data. The BMC may be configured to transmit Scan Response data to the at least one CMC in response to the Scan Request data. The configured Advertising data may include scheduling information for next Advertising data transmission.

The scheduling information may include frequency information and time information for the next Advertising data transmission.

When the BMC receives the Scan Request data, the scheduling information may be updated.

When the BMC does not receive the Scan Request data, the scheduling information may be maintained.

When the BMC does not receive the Scan Request data, the configured Advertising data may be retransmitted.

When the Scan Request data and the Scan Response data are not received within a predetermined period of time, the wireless battery management system for vehicles may be initialized.

The time information may include information about an offset value and an offset unit.

The frequency information may be determined as a channel index.

The frequency information may be determined as any one of channel indices 0 to 36.

Advantageous Effects

According to the present disclosure, wireless communications are applied to a wireless battery management system for vehicles, thereby increasing flexibility in battery pack design, facilitating maintenance and repair, and simplifying production processes.

The wireless battery management system for vehicles may simplify a connection procedure between batteries, thereby reducing a connection time.

DESCRIPTION OF DRAWINGS

FIG. 7 illustrates message formats for the radio link establishment procedure for the long-term key exchange.

Figure 5:
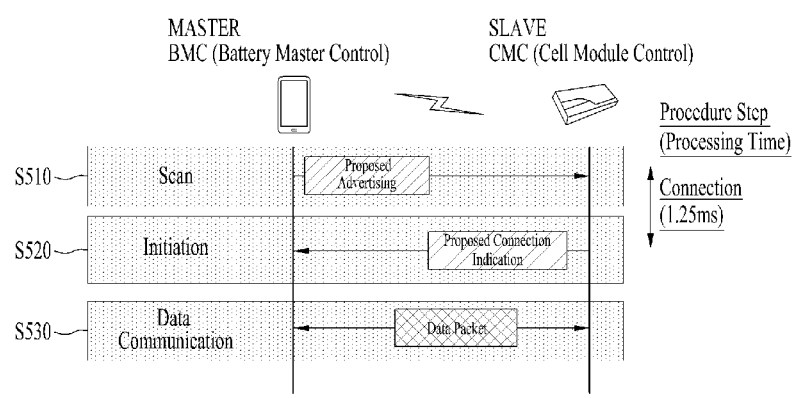
FIG. 5 illustrates a radio link establishment procedure after the long-term key exchange.
Figure 8:
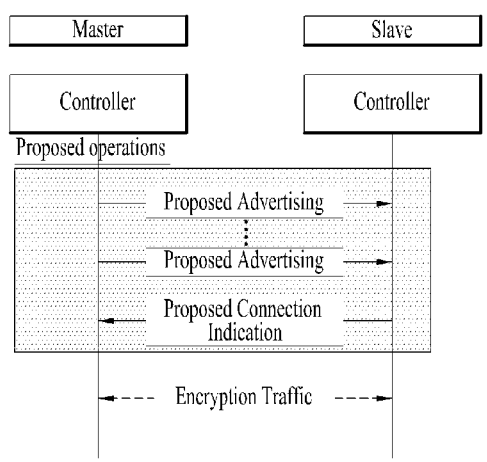

Each process of FIG. 8 may correspond to each process of FIG. 5.

Figure 9:
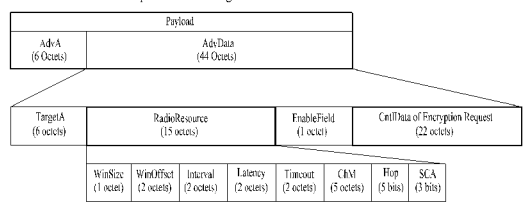

FIG. 9 illustrates message formats for a radio link establishment procedure after the long-term key exchange.

Figure 10A:
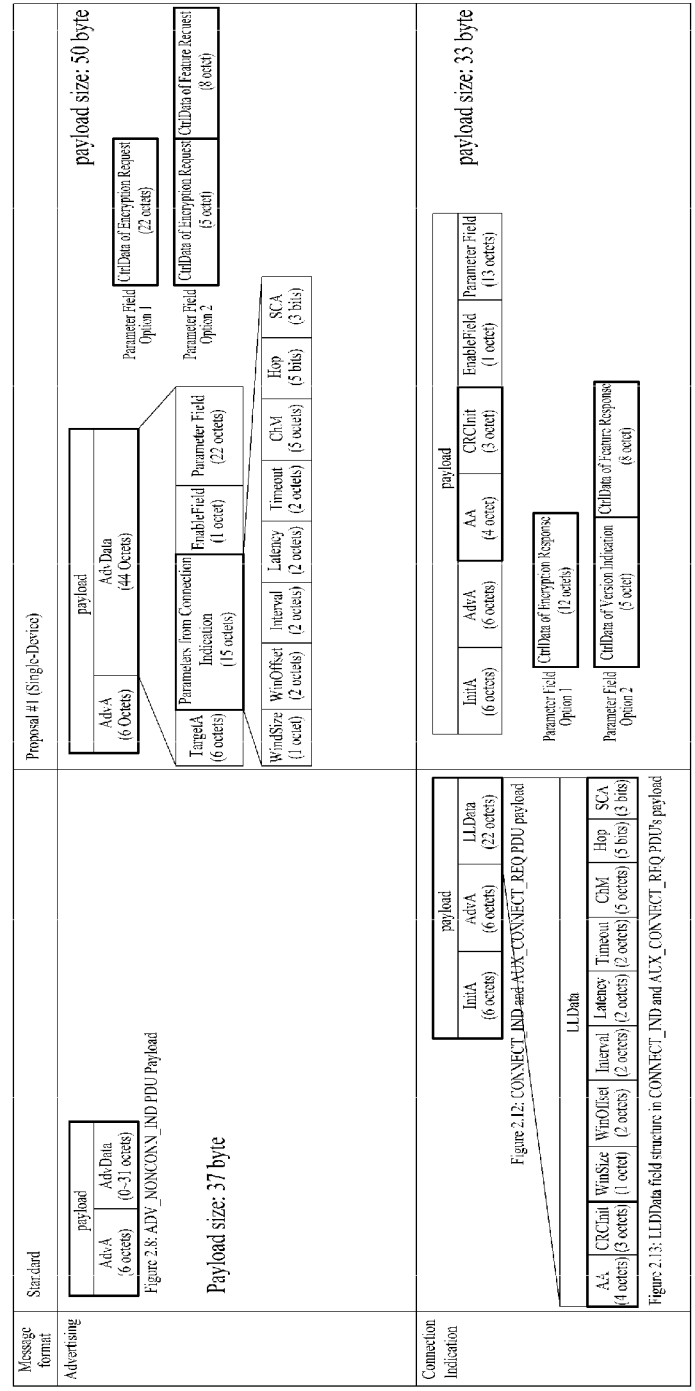
Figure 11:
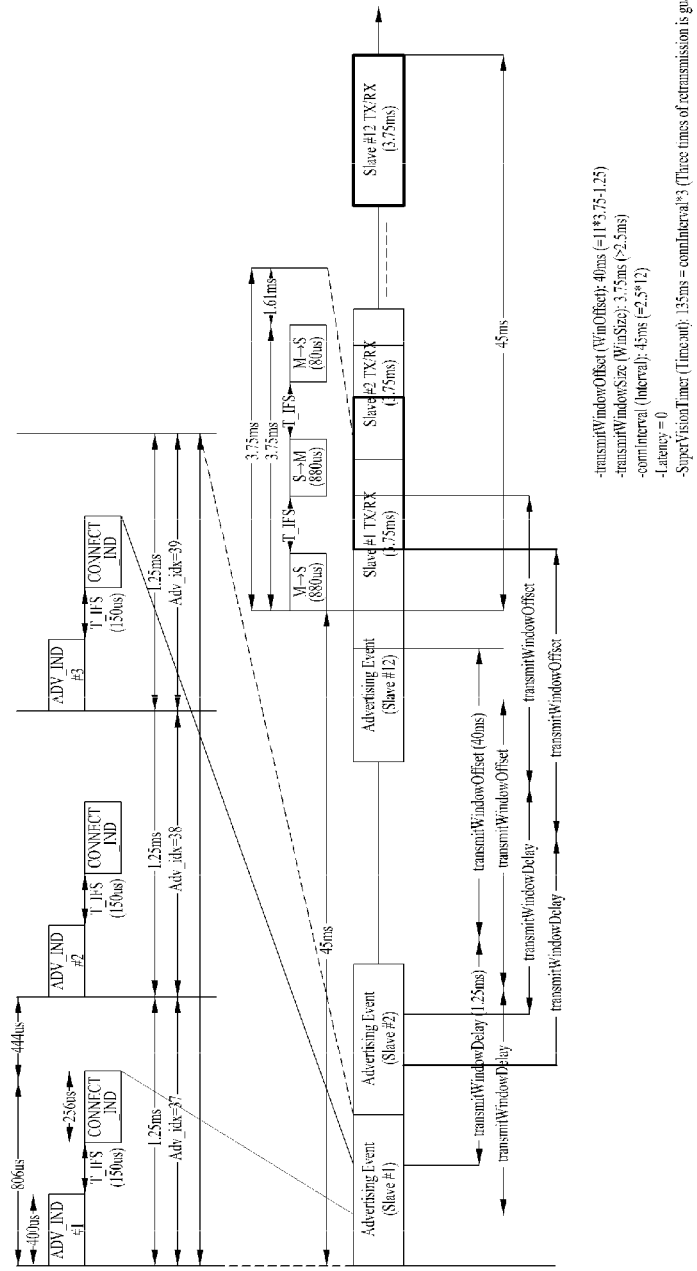

FIGS. 10 (a) and (b) illustrate tables for comparing standard-based message formats and message formats according to embodiments of the present disclosure FIG. 11 illustrates a time required for checking the state of a battery in a wireless battery management system for vehicles according to embodiments of the present disclosure.

Figure 12:
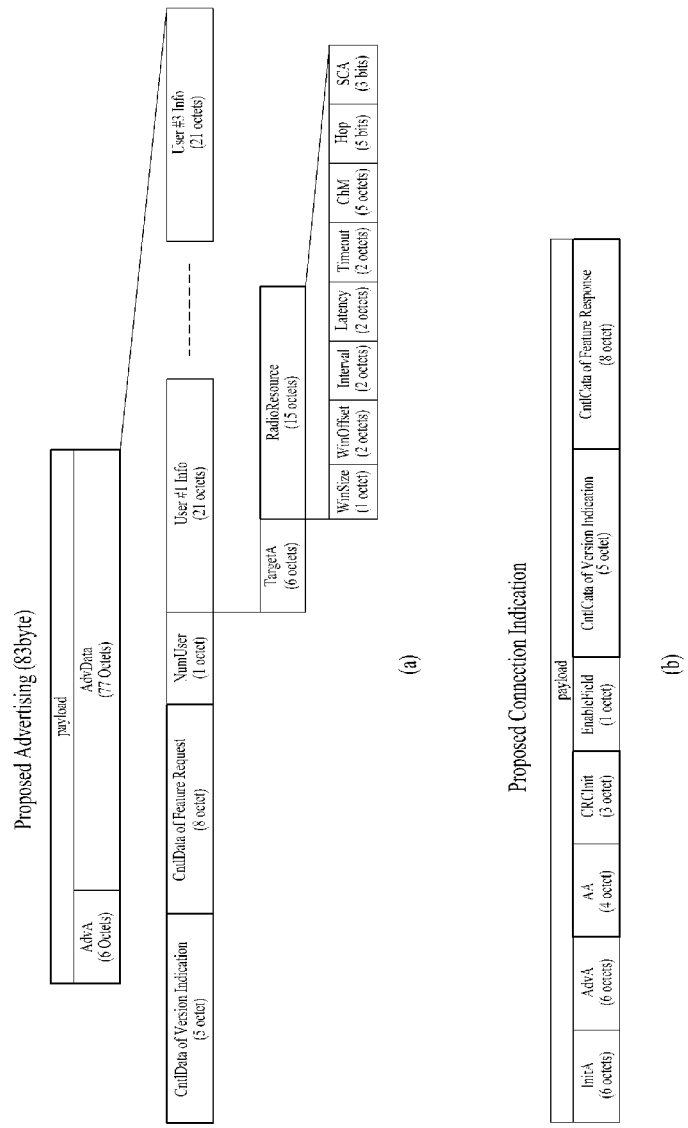

FIG. 12 illustrates multi-device message formats for a radio link establishment procedure for the long-term key exchange according to embodiments of the present disclosure.

FIG. 13 illustrates multi-device message formats for a radio link establishment procedure after the long-term key exchange according to embodiments of the present disclosure.

Figure 14:
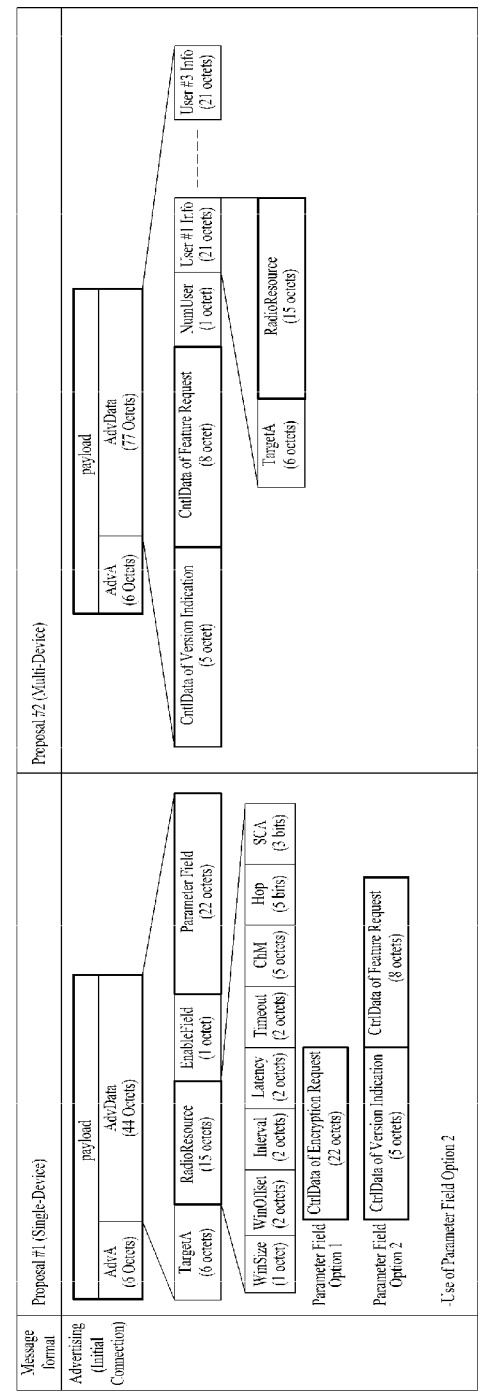

FIGS. 14 and 15 illustrate tables for comparing single-device message formats and multi-device message formats.

Figure 16:
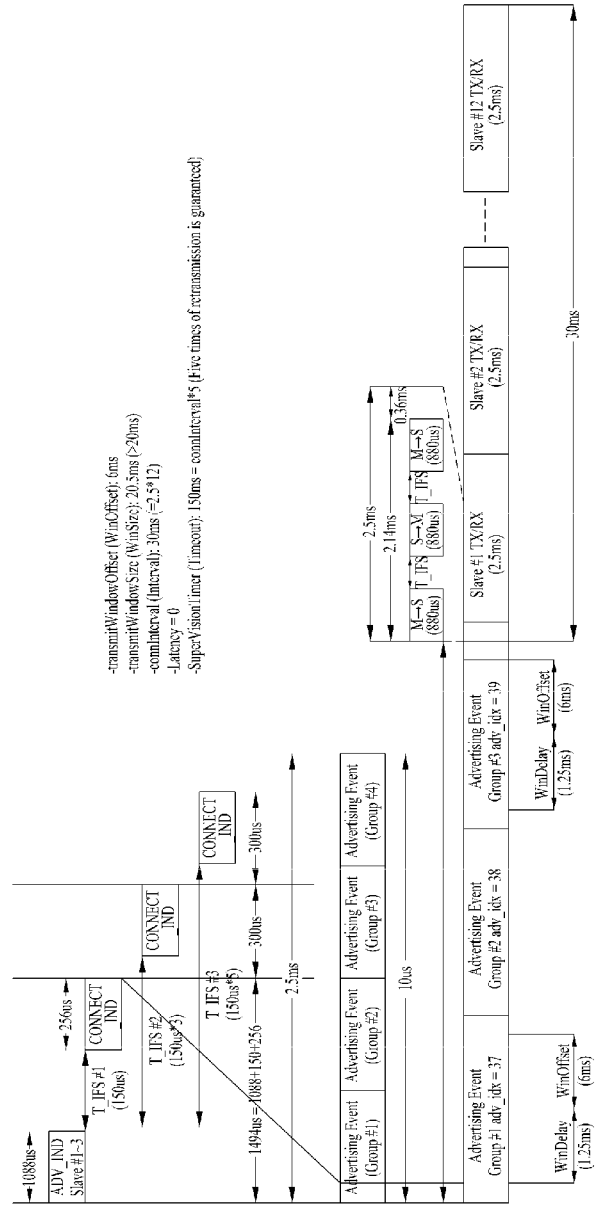

FIG. 16 illustrates a time required for checking the battery state based on multi-device message formats.

Figure 17:
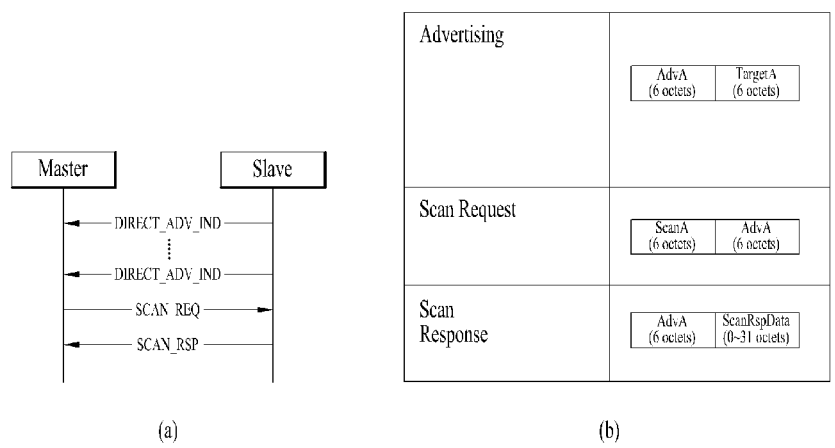

FIG. 17 (*a*) illustrates a standard-based connectionless data transfer technology, and FIG. 17 (*b*) illustrates data formats used for the standard-based connectionless data transfer technology.

Figure 18:
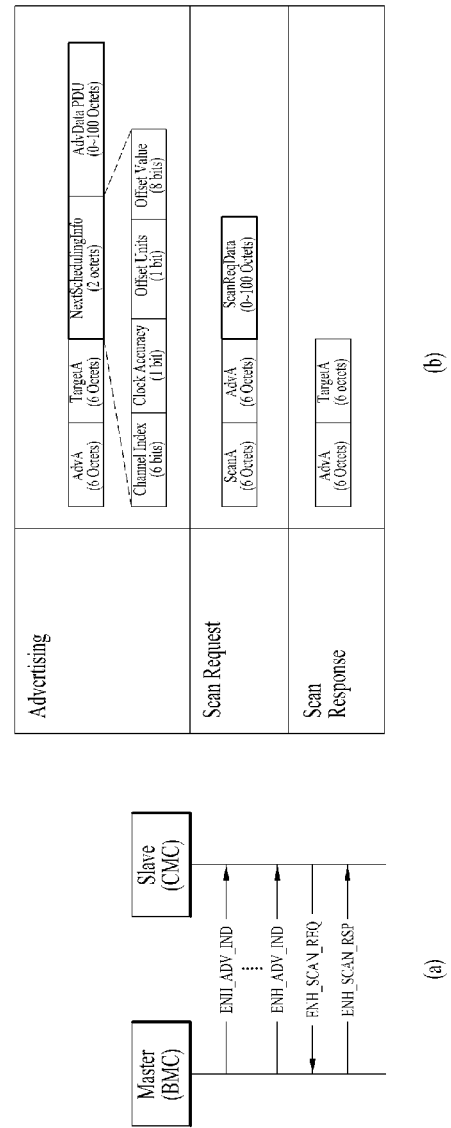

FIG. 18 (*a*) illustrates a connectionless data transfer technology according to an embodiment of the present disclosure, and FIG. 18 (*b*) illustrates data formats used for the connectionless data transfer technology according to an embodiment of the present disclosure.

Figure 19:
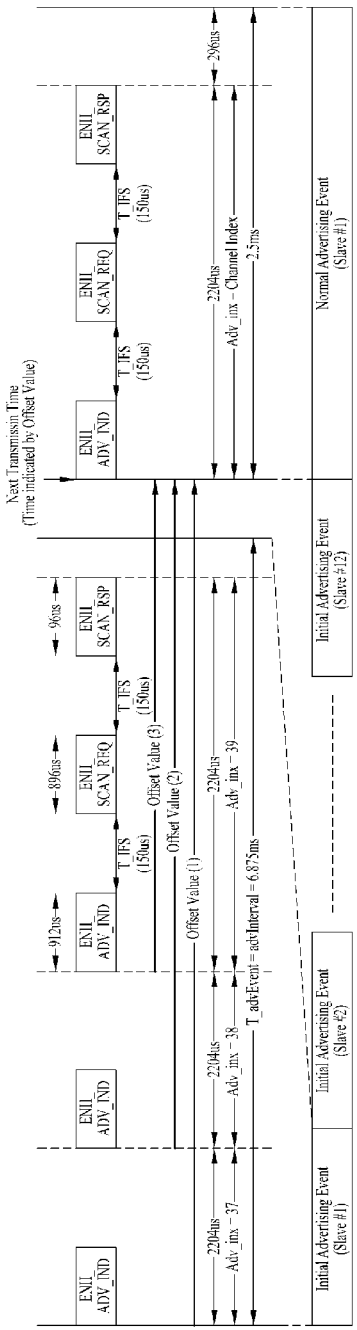

FIG. 19 illustrates a data transmission and reception time according to a flexible scheduling method.

Figure 20:
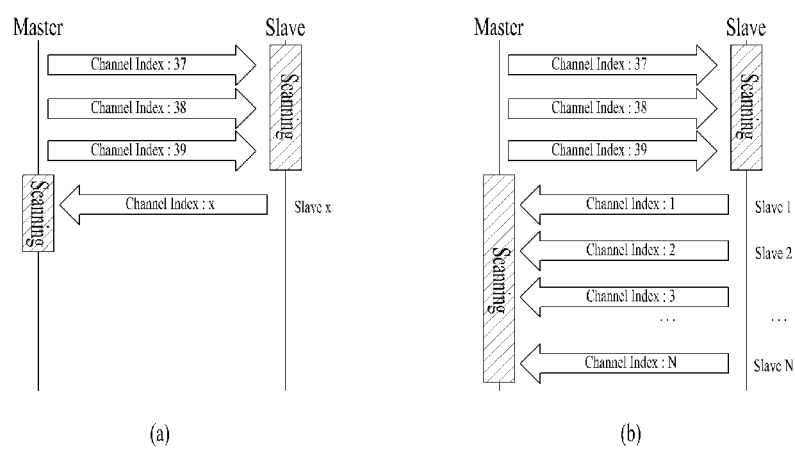

FIG. 20 (*a*) illustrates a method of exchanging data with each slave device, and FIG. 20 (*b*) illustrates a method of exchanging the same data with all slave devices.

FIG. 21 illustrates a master payload of data transmitted from a master device and slave payload transmitted from a slave device according to an embodiment of the present disclosure.

Figure 22:
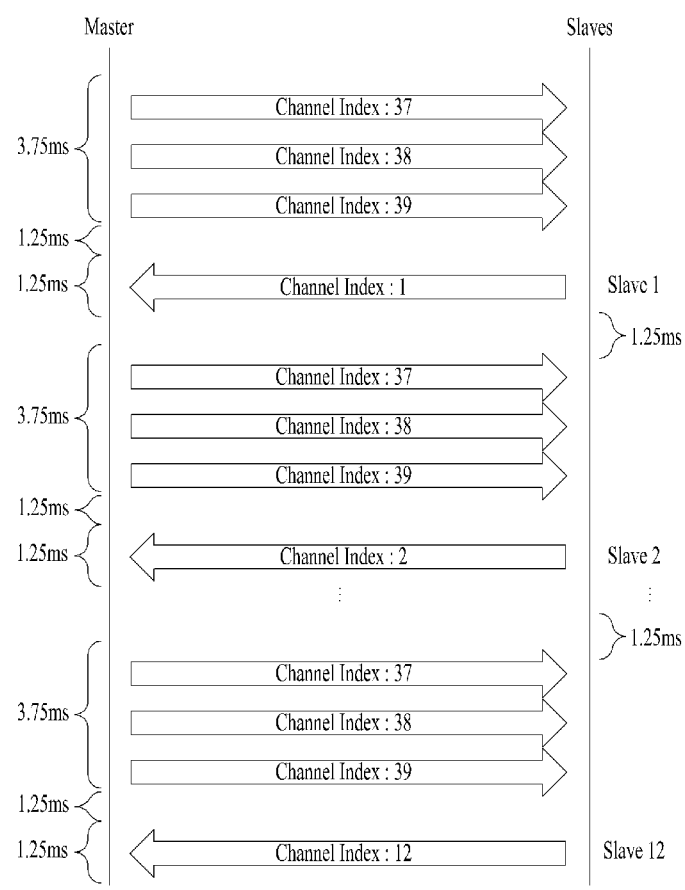

FIG. 22 illustrates a data transmission and reception time when data is transmitted to each slave device based on a fixed scheduling method.

Figure 23:
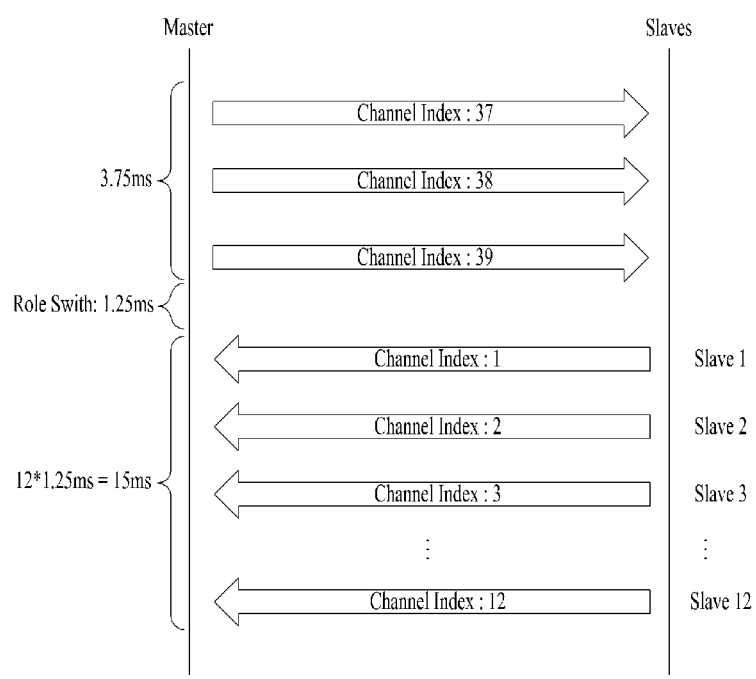

FIG. 23 illustrates a data transmission and reception time when the same data is transmitted to all slave devices based on the fixed scheduling method.

Figure 24:
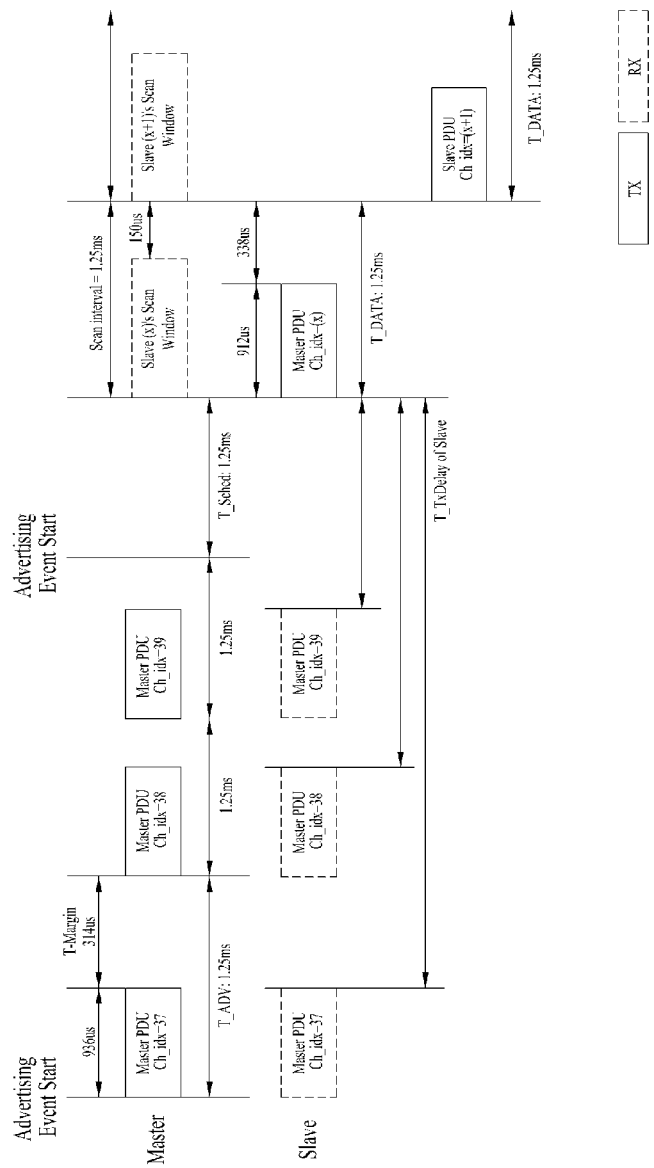

FIG. 24 illustrates a data transmission and reception time based on the fixed scheduling method.

Figure 25:
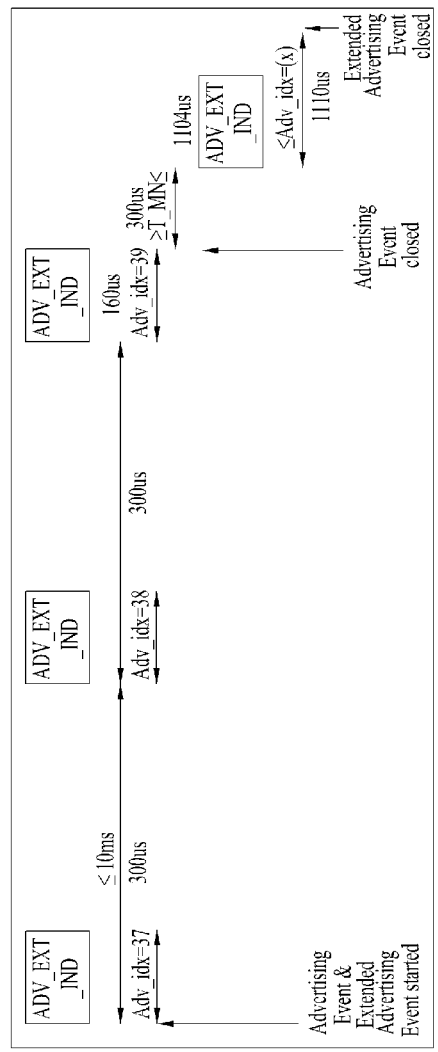

FIG. 25 illustrates a standard-based data transmission and reception time.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

In this document, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Herein, a cell module control unit of a wireless battery management system for vehicles may be referred to as a cell module controller (CMC) or a slave device. In addition, a battery master control unit of the wireless battery management system for vehicles may be referred to as a battery master controller (BMC) or a master device.

1. Wired Battery Management System

Figure 1:
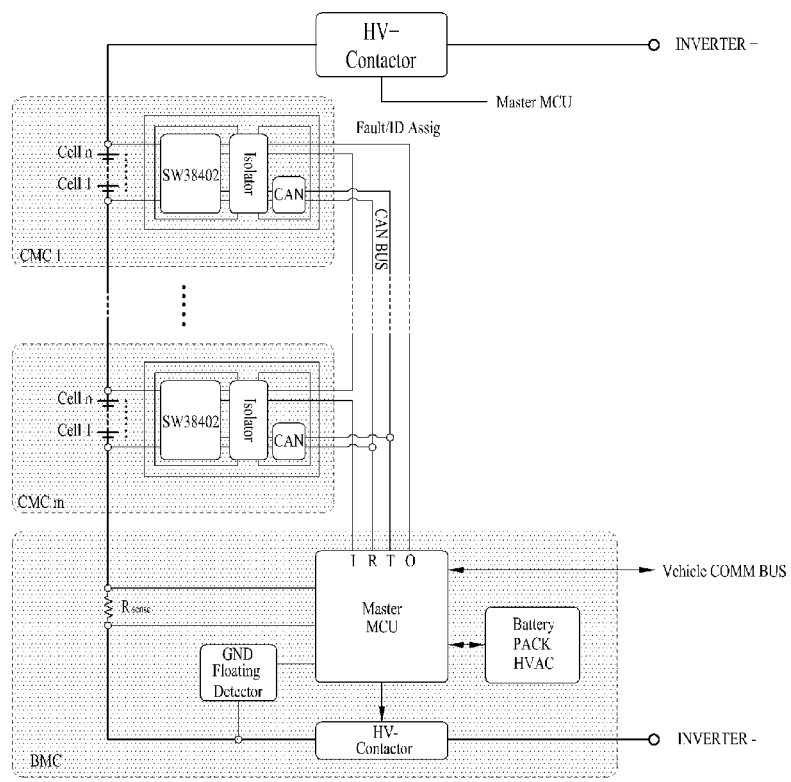
FIG. 1 illustrates a general wired battery management system (BMS)

FIG. 1 illustrates a general wired battery management system.

Referring to FIG. 1, a battery management system (BMS) may include one BMC and m CMCs.

In the CMC, 6 to 8 batteries are connected in series to implement one battery module, and cell module control may be applied to each battery module. In general, 12 CMCs are used for vehicles, but in some cases, 16 or more CMCs may be used. The CMC may perform cell voltage detection (CVD), cell temperature detection (CTD), cell balancing (CB), etc. The battery voltage of an electric vehicle is about 350 to 400 V, and such a necessary voltage may be supplied by the m CMCs.

The BMC refers to a main controller for controlling each CMC through a controller area network (CAN). In addition, the BMC may perform functions of checking or controlling a state of charge (SOC), a state of health (SOH), safety, etc.

Figure 2:
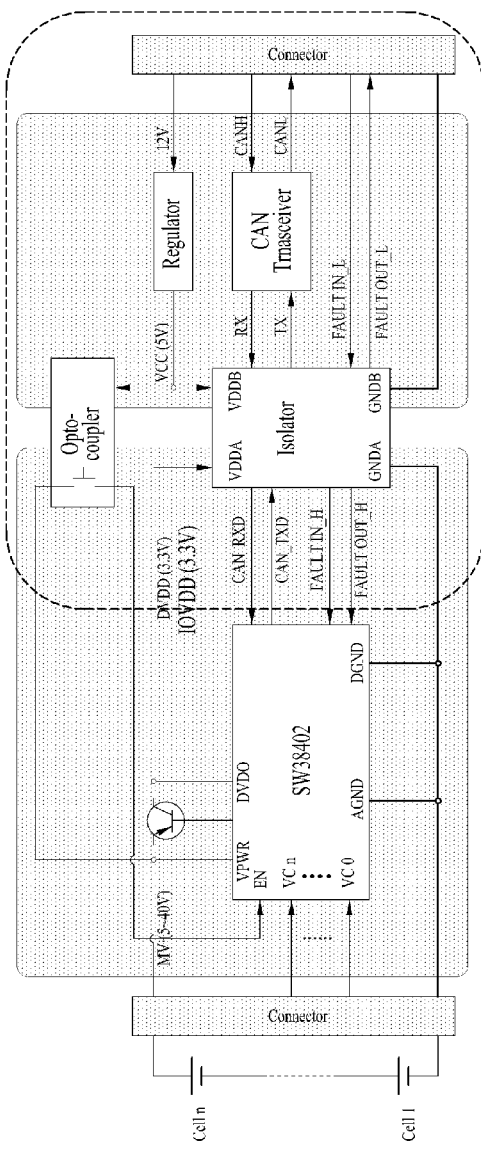
FIG. 2 illustrates a structure of a cell module controller (CMC).

FIG. 2 illustrates a structure of the CMC.

Referring to FIG. 2, each CMC may include several external chips such as SW38402 for internal high voltage control, an isolator, a CAN transceiver, etc.

Generally, wired communication is used for the BMS for vehicles. However, since the wired communication BMS requires a large amount of cable, the production process is complicated and the production cost increases.

Thus, a wireless BMS capable of replacing the CAN used in the current wired BMS to Bluetooth Low Energy (BLE) needs to be developed. Specifically, the dotted line of FIG. 2 needs to be replaced with a wireless technology.

The wireless communication BMS may increase flexibility in battery pack design. In addition, the fuel efficiency may also increase as the weight decreases. Further, as the number of components decreases, the quality management and maintenance/repair may be simplified.

The general requirements of the BMS are as follows. First, the BMS requires one BMC and 12 CMCs. Second, a time required for checking the state of a battery after the BMS is turned on and initialized needs to be within 150 to 400 ms.

According to a conventional connection-oriented data transfer technology, a time required for connecting the 12 CMCs to the BMS wirelessly is 4524 ms=377 ms*12 devices. Thus, the time required for checking the battery state is about 4.5 s or longer. Thus, the conventional connection-oriented data transfer technology may not satisfy the requirements of the BMS.

According to a conventional connectionless data transfer technology, when an advertising procedure is performed with no wireless connection, only three frequencies (channel index=37, 38, and 39) among total 40 Bluetooth frequencies are used. In this case, if advertising messages are transmitted to multiple devices, there may be collisions between the advertising messages. As a result, the reception rate of a receiver may decrease, thereby degrading the overall reliability. The advertising message may be transmitted only in one way, i.e., to the slave device. However, for bidirectional data communication, a time required for role switching and synchronization between devices are additionally required. In this case, since data is transferred in one way, it is difficult to recognize whether the data is received by a peer device, and as a result, the reliability is degraded.

In the conventional connection-oriented and connectionless data transfer technologies, the slave device acts as an advertiser transmitting the advertising message, and the master device acts as a scanner scanning the advertising message. These protocols are advantageous in that the master device easily manages data transmission allocation information for all slave devices. However, since each of the 12 slave devices transmits its advertising message, the message reception rate may be degraded due to collisions between advertising messages.

On the other hand, when the master device act as an advertiser transmitting the advertising message and the slave device acts as a scanner scanning the advertising message, each of the 12 slave devices receives the advertising message transmitted from the single master device, and thus the reception rate of the advertising message may be improved. However, considering that radio resources are allocated by the slave device, there may be scheduling collisions between different connections. Thus, connection failure may occur, or the data reception rate may be degraded.

In a connection-oriented data transfer technology according to embodiments of the present disclosure, a connection procedure may be simplified by modifying an existing message(s) so that a time required for wireless connections may be reduced. In addition, the master device and the slave device may serve as the advertiser and the scanner, respectively. That is, the master device may transmit the advertising message including information about radio resources respectively allocated to the 12 slave devices, thereby compensating for the above disadvantages.

In a connectionless data transfer technology according to embodiments of the present disclosure, other frequencies (0 to 36) besides the three frequencies (37, 38, and 39) are used so that the impact of channel interference may be mitigated. In addition, two allocation methods are proposed to determine radio resources (frequency and time) for data transmission. Specifically, the present disclosure proposes a fixed scheduling method in which the frequency and time of a radio resource are fixed and a flexible scheduling method in which the frequency and time of a radio resource are variable. Further, since bidirectional data transmission and reception is performed, whether a peer device receives data or not may be checked.

With development of the wireless communication BMS, a technique for improving the speed and reliability of the wireless communication BMS has been researched. Hereinafter, the connection-oriented and connectionless data transfer technologies proposed in the present disclosure will be described in detail.

2. Connection-Oriented Data Transfer Technology 2.1. Standard-Based BLE Radio Link Establishment Procedure FIG. 3 illustrates a standard-based BLE radio link establishment procedure.

Figure 3:
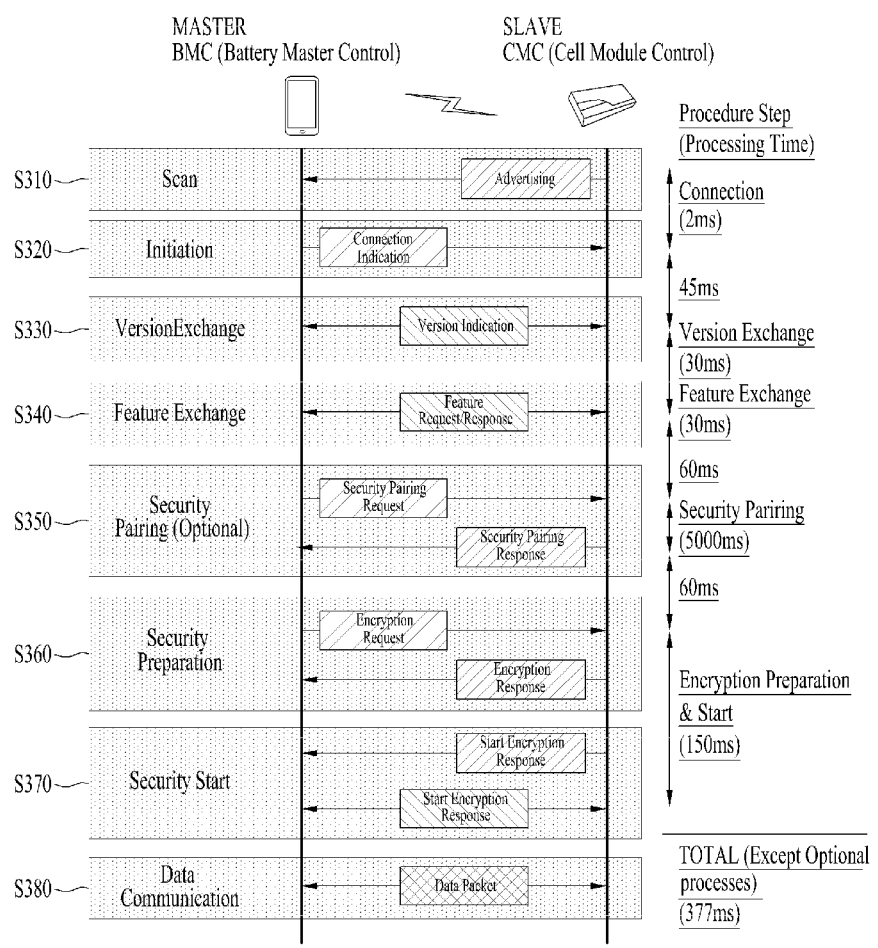
FIG. 3 illustrates a standard-based Bluetooth Low Energy (BLE) radio link establishment procedure.

Referring to FIG. 3, security key exchange and scheduling procedures may be performed for data transmission and reception between the BMC acting as the master device and the CMC acting as the slave device.

Referring to a standard-based scan process (S310), the CMC may transmit an Advertising message, and the BMC may receive the Advertising message transmitted from the CMC. Since the Advertising message includes the identifier (ID) of the CMC transmitting the Advertising message, the BMC may identify which CMC transmits the Advertising message upon receiving the Advertising message. The scan process in which the master device discovers the slave device in the vicinity thereof may be performed as described above.

Referring to a standard-based initiation process (S320), the BMC may transmit a Connection Indication message to the CMC. During the initiation process, radio resources may be allocated, and a wireless connection may be established.

Referring to a standard-based version exchange process (S330), the BMC may exchange a Version Indication message with the CMC. During the version exchange process, one device may inform a peer device of a message standard version.

Referring to a standard-based feature exchange process (S340), the BMC may exchange a Feature Request message and a Feature Response message with the CMC. During the feature exchange process, one device may inform a peer device of a supported feature.

Referring to a standard-based security pairing process (S350), the BMC may transmit a Security Pairing Request message to the CMC, and the CMC may transmit a Security Pairing Response message to the BMC. Since a long-term key is generated by a higher protocol for the security pairing process, no security pairing process may be required after the security pairing process is performed at the beginning. Thus, in general, when a user starts a vehicle, no security pairing process may be performed.

Referring to a standard-based security preparation process (S360), the BMC may transmit an Encryption Request message to the CMC, and the CMC may transmit an Encryption Response message to the BMC. A security session key may be exchanged during the security preparation process.

Referring to a standard-based security start process (S370), the CMC may transmit a Start Encryption Request message to the BMC. In addition, the CMC may exchange a Start Encryption Response message with the BMC. Encryption may be performed during the security start process.

Referring to a standard-based data communication process (S380), the BMC and CMC may exchange a data packet.

A time required for the BMC and CMC to start data exchange after the vehicle is started may be about 377 ms, except the security pairing process performed in factory initialization.

Hereinafter, a description will be given of a method of saving time by simplifying procedures for establishing a wireless connection for data transfer in the wireless battery management system for vehicles according to embodiments of the present disclosure.

2.2. Radio Link Establishment Procedure for Long-Term Key Exchange

Figure 4:
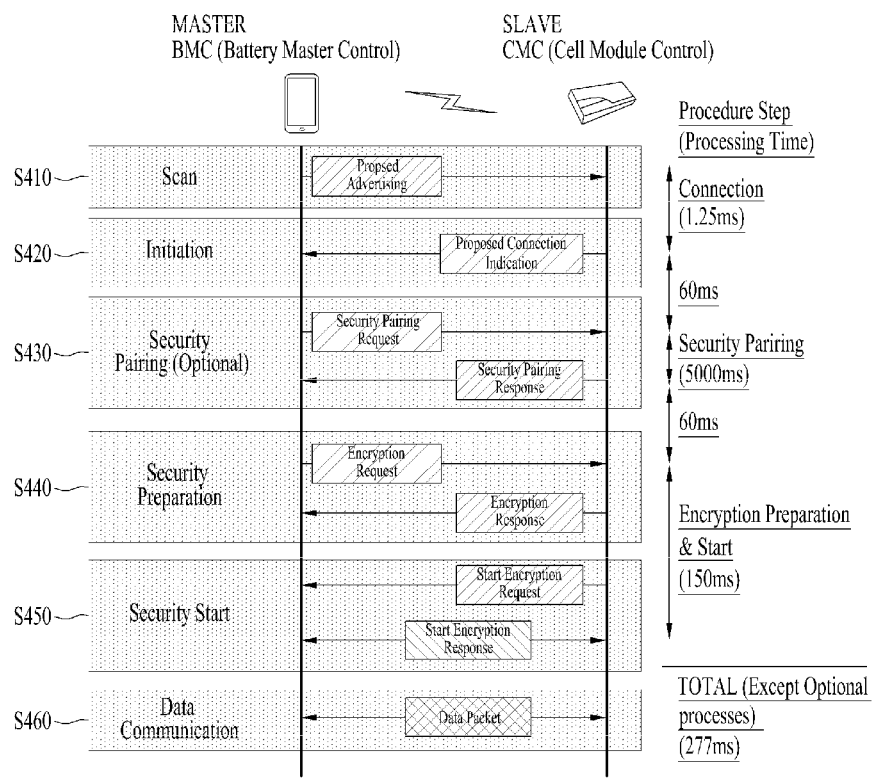
FIG. 4 illustrates a radio link establishment procedure for long-term key exchange.

FIG. 4 illustrates a radio link establishment procedure for long-term key exchange.

The radio link establishment procedure for the long-term key exchange may be performed only in factory initialization and repair work.

Referring to a scan process (S410), the BMC may transmit an Advertising message to the CMC in the wireless battery management system for vehicles according to embodiments of the present disclosure. The Advertising message according to embodiments of the present disclosure may include information about the message standard version, which is included in the standard-based Version Indication message and transmitted in the standard-based version exchange process (S330). The Advertising message according to embodiments of the present disclosure may include information about the supported feature of the master device, which is included in the standard-based Feature Request message and transmitted in the standard-based version exchange process (S330). That is, the Advertising message according to embodiments of the present disclosure transmitted in the scan process (S410) may include messages transmitted from the BMC to the CMC in the standard-based version exchange process (S330) and version feature exchange process (S340), thereby achieving the procedure simplification.

In the standard-based BMS, the slave device transmits the Advertising message to the master device. In the wireless battery management system for vehicles according to embodiments of the present disclosure, the master device transmits the Advertising message to the slave device. That is, since the Advertising message is transmitted from one device, the transmission rate of the Advertising message may be improved.

In the standard-based BMS, the Connection Indication message transmitted from the master device may include resource allocation information for the slave device. In the wireless battery management system for vehicles according to embodiments of the present disclosure, the Advertising message may include radio resource information. The radio resource information may mean information about radio resources to be used by the CMC that receives the Advertising message. The radio resource information may correspond to information except information about an access address (AA) and a CRC initial value, which is included in the standard-based Connection Indication message and transmitted in the standard-based Initiation process (S320).

Referring to an initiation process (S420), the CMC may transmit a Connection Indication message to the BMC in the wireless battery management system for vehicles according to embodiments of the present disclosure. The Connection Indication message according to embodiments of the present disclosure may include the information about the message standard version, which is included in the standard-based Version Indication message and transmitted in the standard-based version exchange process (S330). The Advertising message according to embodiments of the present disclosure may include the supported feature of the slave device, which is included in the standard-based Feature Response message and transmitted in the standard-based feature exchange process (S340). That is, the Connection Indication message according to embodiments of the present disclosure transmitted in the initiation process (S420) may include messages transmitted from the CMC to the BMC in the standard-based version exchange process (S330) and version feature exchange process (S340), thereby achieving the procedure simplification.

Further, the Connection Indication message according to embodiments of the present disclosure may include contention resolution information such as an AA and a CRC initial value.

Due to the scan process (S410) and initiation process (S420) according to embodiments of the present disclosure, the standard-based version exchange process (S330) and feature exchange process (S340) may be omitted. Thus, the time required to start data exchange after the vehicle is started may be reduced to about 277 ms. That is, compared to the standard, the time may be reduced by about 105 ms. The 105 ms is merely exemplary, and the reduction is expected to have various values.

A security paring process (S430), a security preparation process (S440), a security start process (S450), and a data exchange process (S460) according to embodiments of the present disclosure may be performed in the same way as the standard-based processes.

2.3. Radio Link Establishment Procedure after Long-Term Key Exchange

FIG. 5 illustrates a radio link establishment procedure after the long-term key exchange.

The radio link establishment procedure after the long-term key exchange may be applied whenever the vehicle is started.

Referring to a scan process (S510), the BMC may transmit an Advertising message to the CMC in the wireless battery management system for vehicles according to embodiments of the present disclosure. The Advertising message according to embodiments of the present disclosure may include the standard-based Encryption Request message including the security session key, which is transmitted in the standard-based security preparation process (S360).

The Advertising message according to embodiments of the present disclosure may further include radio resource information. The radio resource information may mean information about radio resources to be used by the CMC that receives the Advertising message. The radio resource information may correspond to information except information about an AA and a CRC initial value, which is included in the standard-based Connection Indication message and transmitted in the standard-based Initiation process (S320).

Referring to an initiation process (S520), the CMC may transmit a Connection Indication message to the BMC in the wireless battery management system for vehicles according to embodiments of the present disclosure. The Connection Indication message according to embodiments of the present disclosure may include the security session key, which is included in the standard-based Encryption Response message and transmitted in the standard-based security preparation process (S360). The Connection Indication message according to embodiments of the present disclosure may include the Start Encryption Request message and Start Encryption Response message, which are transmitted in the standard-based security start process (S370). That is, the initiation process (S520) according to embodiments of the present disclosure may include messages transmitted from the CMC to the BMC in the standard-based security preparation process (S360) and security start process (S370), thereby achieving the procedure simplification.

Further, the Connection Indication message according to embodiments of the present disclosure may include contention resolution information such as an AA and a CRC initial value.

Due to the scan process (S510) and initiation process (S520) according to embodiments of the present disclosure, the standard-based security preparation process (S360) and security start process (S370) may be omitted. Thus, the time required to start data exchange after the vehicle is started may be reduced by about 210 ms. In addition, since the standard-based version exchange process (S330) and feature exchange process (S340) may be omitted in the radio link establishment procedure according to embodiments of the present disclosure, the time required to start data exchange after the vehicle is started may be reduced by about 105 ms.

According to embodiments of the present disclosure, one message may carry multiple pieces of information required for reducing the radio link establishment time, thereby simplifying the establishment procedure. Further, since the master device transmits the Advertising message by including radio resource information allocated to each of the 12 slave devices therein, thereby solving the radio resource collision problem.

A data exchange process may be performed in the same way as the standard-based data exchange process.

2.4. Message Format

Hereinafter, a description will be given of message formats used for the radio link establishment procedure with reference to embodiments of the present disclosure. The message formats may include a message format for a single device (single-device message format) and a message format for multiple devices (multi-device message format)

The single-device message format is a message format for connecting to one device in one Advertising message. That is, the BMC may transmit an Advertising message with the single-device message format to connect to one CMC. When the single-device message format is used, the time required for checking the battery state after the vehicle is started is about 90 ms with respect to the 12 slave devices. Here, the 90 ms covers a connection time of 45 ms and a 100-byte data transmission and reception time of 45 ms.

The multi-device message format may be a message format for connecting to multiple devices in one Advertising message. That is, the BMC may transmit an Advertising message with the multi-device message format to connect to multiple CMCs. When the multi-device message format is used, the time required for checking the battery state is about 60 ms with respect to the 12 slave devices. Here, the 60 ms covers a connection time of 30 ms and a 100-byte data transmission and reception time of 30 ms.

2.4.1. Message Format for Single Device 2.4.1.1. Message Format for Radio Link Establishment Procedure for Long-Term Key Exchange FIG. 6 illustrates a radio link establishment procedure for the long-term key exchange.

Figure 6:
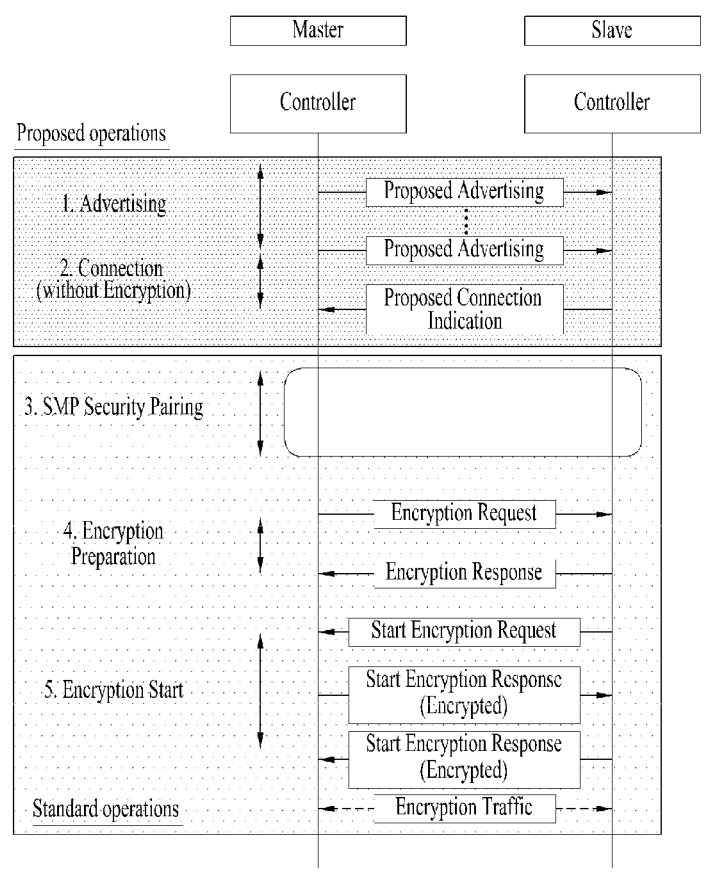
FIG. 6 illustrates a radio link establishment procedure for the long-term key exchange.

Each process of FIG. 6 may correspond to each process of FIG. 4. Specifically, an advertising process of FIG. 6 may correspond to the scan process of FIG. 4, and a connection process of FIG. 6 may correspond to the initiation process of FIG. 4. In this case, the Advertising message transmitted by the master device, BMC may be a periodically broadcast message.

FIG. 7 illustrates message formats for the radio link establishment procedure for the long-term key exchange.

In FIG. 7, FIG. 7 (a) illustrates the format of an Advertising message transmitted from the BMC to the CMC in the advertising process of FIG. 6, and FIG. 7 (b) illustrates the format of a Connection Indication message transmitted from the CMC to the BMC in the connection process of FIG. 6.

Referring to FIG. 7 (a), the Advertising message according to embodiments of the present disclosure may include an AdvA field (6 octets) and an AdvData field (35 octets). The AdvA field may include information on the ID of the master device, BMC. Upon receiving the Advertising message, the CMC may identify which BMC transmits the Advertising message based on the AdvA field. The AdvData field may include a TargetA field (6 octets), a RadioResource field (15 octets), an EnableField field (1 octet), a CntlData of Version Indication field (5 octets), and a CntlData of Feature Request field (8 octets).

The TargetA field may include information on the ID of the slave device receiving the Advertising message, CMC. When 12 CMCs are used in the wireless battery management system for vehicles, each of the 12 CMCs may have its own ID. The TargetA field may include the ID of one target CMC among the 12 CMCs.

The RadioResource field may include information about radio resources for the slave device corresponding to a connection target, CMC. Upon receiving the Advertising message, the slave device, CMC may transmit the Connection Indication message based on the radio resource information.

The EnableField field may include information about the format of a message to be received.

The CntlData of Version Indication field may include standard support version information. The standard support version information may be information included in the Version Indication message transmitted in the standard-based version exchange process (S330). Thus, according to embodiments of the present disclosure, the standard-based version exchange process (S330) may be omitted.

The CntlData of Feature Request field may include feature support information. The feature support information may be information included in the Feature Request/Response message transmitted in the standard-based feature exchange process (S340). Thus, according to embodiments of the present disclosure, the standard-based feature exchange process (S340) may be omitted.

Referring to FIG. 7 (b), the Connection Indication message according to embodiments of the present disclosure may include an InitA field (6 octets), an AdvA field (6 octets), an AA field (4 octets), a CRCInit field (3 octets), an EnableField field (1 octet), a CntlData of Version Indication field (5 octets), and a CntlData of Feature Response field (8 octets).

The InitA field may include information on the ID of the slave device, CMC. The CMC transmits its ID to the BMC in the Connection Indication message. Thus, upon receiving the Connection Indication message, the BMC may identify which CMC transmits the Connection Indication message.

The AdvA field may include information on the ID of the master device, BMC. Upon receiving the Connection Indication message, the master device may recognize that the Connection Indication message is transmitted in response to the Advertising message transmitted by the master device.

The AA and CRCInit fields may include contention resolution information. The EnableField field may include information about the format of a message to be received.

The CntlData of Version Indication field may include standard support version information, and the CntlData of Feature Request field may include feature support information.

Due to the Advertising message and Connection Indication message according to embodiments of the present disclosure, the standard-based version exchange process (S330) and standard-based feature exchange process (S340) may be omitted.

2.4.1.2 Message Format for Radio Link Establishment Procedure after Long-Term Key Exchange Each process of FIG. 8 may correspond to each process of FIG. 5.

FIG. 9 illustrates message formats for a radio link establishment procedure after the long-term key exchange.

In FIGS. 8 and 9, FIG. 9 (*a*) illustrates the format of an Advertising message transmitted from the master device to the slave device in an advertising process of FIG. 8, and FIG. 9 (*b*) illustrates the format of a Connection Indication message transmitted from the slave device to the master device in FIG. 8.

Referring to FIG. 9 (*a*), the Advertising message according to embodiments of the present disclosure may include an AdvA field (6 octets) and an AdvData field (44 octets). The AdvA field may include information on the ID of the master device, BMC. The AdvData field may include a TargetA field (6 octets), a RadioResource field (15 octets), an EnableField field (1 octet), and a CtrlData of Encryption Request field (22 octets).

The TargetA field, RadioResource field, and EnableField field may include the same information as that described above in FIG. 7 (*a*).

The CtrlData of Encryption Request field may include information about security of the mater device required for security key generation. The CtrlData of Encryption Request field may include the information included in the Encryption Request message transmitted in the standard-based security preparation process (S360). Thus, according to an embodiment of the present disclosure, the standard-based security preparation process (S360) may be omitted.

Referring to FIG. 9 (*b*), the Connection Indication message according to embodiments of the present disclosure may include an InitA field (6 octets), an AdvA field (6 octets), an AA field (4 octets), a CRCInit field (3 octets), an EnableField field (1 octet), and a CtrlData of Encryption Response field (12 octets)

The InitA field, AdvA field, AA field, CRCInit field, and EnableField field may include the same information as that described above in FIG. 7 (*b*).

The CtrlData of Encryption Response field may include information about security of the slave device required for security key generation. The CtrlData of Encryption Response field may include the information included in the Encryption Response message transmitted in the standard-based security preparation process (S360). Thus, according to an embodiment of the present disclosure, the standard-based security preparation process (S360) may be omitted.

FIGS. 10 (*a*) and (*b*) illustrate tables for comparing standard-based message formats and message formats according to embodiments of the present disclosure Referring to FIGS. 10 (*a*) and 10 (*b*), an AdvData field included in the standard-based Advertising message may be 0 to 31 octets, and an AdvData field according to embodiments of the present disclosure may be 44 octets. The AdvData field according to embodiments of the present disclosure may include a CtrlData of Encryption Request field, which is based on option 1 and included in the standard-based Encryption Request message. The AdvData field according to embodiments of the present disclosure may include a CntlData of Version Indication field and a CntlData of Feature Request field, which are based on option 2 and included in the standard-based Version Indication message and Feature Request/Response message. Further, the AdvData field according to embodiments of the present disclosure may include resource allocation information included in the standard-based Connection Indication message but may not include contention resolution information such as an AA field and a CRCInit field.

A Connection Indication message according to embodiments of the present disclosure may include the resolution information such as the AA field and the CRCInit field, which is included in the standard-based Connection Indication message. The Connection Indication message according to embodiments of the present disclosure may include a CtrlData of Encryption Response field, which is based on option 1, or the CntlData of Version Indication field and CntlData of Feature Request field, which are based on option 2.

FIG. 11 illustrates a time required for checking the battery state in the wireless battery management system for vehicles according to embodiments of the present disclosure.

Manufacturers require that the time required for checking the battery state after the BMS is turned on and initialized is within 150 to 400 ms. Referring to FIG. 11, when a wireless connection method for a single device according to embodiments of the present disclosure is applied, the time required for checking the battery state is about 90 ms with respect to the 12 slave devices. Here, the 90 ms covers a connection time of 45 ms (3.75 ms*12) and a 100-byte transmission and reception time of 45 ms.

Specifically, the size of an Advertising message may be about 50 bytes, and a time required for transmitting the Advertising message may be about 400 us. The size of a Connection Indication message may be about 33 bytes, and a time required for transmitting the Connection Indication message may be about 256 us. To increase the transmission rate of the Advertising message, the Advertising message may be transmitted three times. Thus, a time required for the BMC to connect to one CMC may be about 3.75 ms.

A time required for the BMC and CMC to exchange data may be about 2140 us. A time required for each of the BMC and CMC to transmit data may be about 880 us. A time required for switching between transmission and reception, T_IFS may be about 150 us, and the switching may be performed twice. Further, a time required to transmit an ACK message may be about 80 us.

2.4.2 Message Format for Multiple Devices

FIG. 12 illustrates multi-device message formats for a radio link establishment procedure for the long-term key exchange according to embodiments of the present disclosure.

Referring to FIG. 12 (*a*), an Advertising message for multiple devices (multi-device Advertising message) according to embodiments of the present disclosure may include an AdvA field (6 octets) and an AdvData field (77 octets). The AdvData field may include a CntlData of Version Indication field (5 octets), a CntlData of Feature Response field (8 octets), a numUser field (1 octet), a User #1 Info field (21 octets), a User #2 Info field (21 octets), and a User #3 Info field (21 octets). Each User Info field may include a TargetA field (6 octets) and a RadioResource field (15 octets). The RadioResource field may include a WinSize field (1 octet), a WinOffset field (2 octets), an Interval field (2 octets), a Latency field (2 octets), a Timeout field (2 octets), a ChM field (5 octets), a Hop field (5 bits), and a SCA field (3 bits).

The multi-device Advertising message according to embodiments of the present disclosure may include the IDs of a plurality of slave devices and resource allocation information therefor. Thus, the master device may connect to the plurality of slave devices in one Advertising message. Although FIG. 12 (*a*) shows an Advertising message capable of connecting with three slave devices, the present disclosure is not limited to the number of slave devices.

Referring to FIG. 12 (*b*), a Connection Indication message for multiple devices (multi-device Connection Indication message) according to embodiments of the present disclosure may include an InitA field (6 octets), an AdvA field (6 octets), an AA field (4 octets), a CRCInit field (3 octets), an EnableField field (1 octet), a CntlData of Version Indication field (5 octets), and a CntlData of Feature Response field (8 octets).

The multi-device Connection Indication message according to embodiments of the present disclosure is a message transmitted from one slave device to one master device, the multi-device Connection Indication message may have the same message format as that of a Connection Indication message for a single device.

FIG. 13 illustrates multi-device message formats for a radio link establishment procedure after the long-term key exchange according to embodiments of the present disclosure.

Referring to FIG. 13 (a), an Advertising message according to embodiments of the present disclosure may include an AdvA field (6 octets) and an AdvData field (77 octets). The AdvData field may include a numUser field (1 octet), a User #1 Info field (43 octets), a User #2 Info field (43 octets), and a User #3 Info field (43 octets). The User #1 Info field may include a TargetA field (6 octets), a RadioResource field (15 octets), and a CtrlData of Encryption Request field (22 octets). The RadioResource field may include a WinSize field (1 octet), a WinOffset field (2 octets), an Interval field (2 octets), a Latency field (2 octets), a Timeout field (2 octets), a ChM field (5 octets), a Hop field (5 bits), and a SCA field (3 bits).

Referring to FIG. 13 (b), a Connection Indication message according to embodiments of the present disclosure may include an InitA field (6 octets), an AdvA field (6 octets), an AA field (4 octets), a CRCInit field (3 octets), an EnableField field (1 octet), and a CtrlData of Encryption Response field (12 octets).

FIGS. 14 and 15 illustrate tables for comparing single-device message formats and multi-device message formats.

Referring to FIG. 14, the AdvData field in an Advertising message for a single device (single-device Advertising message) according to embodiments of the present disclosure, which is used in the initial connection process, is 44 octets, and the AdvData field of a multi-device Advertising message is 77 octets. The single-device Advertising message is targeted to one CMC, and the multi-device Advertising message is targeted to a plurality of CMCs. Thus, the single-device Advertising message may include the ID of one CMC and resource allocation information therefor, and the multi-device Advertising message may include the IDs of a plurality of CMCs and resource allocation information therefor. The multi-device Advertising message may have a larger size than the single-device Advertising message. Although FIG. 14 shows that the multi-device Advertising message is targeted to three CMCs, the present disclosure is not limited thereto.

FIG. 15 illustrates a single-device Advertising message and a multi-device Advertising message according to embodiments of the present disclosure used in general connection processes after the initial connection process, that is, which is generally used when the vehicle is started by the user.

Referring to FIG. 15, the single-device Advertising message according to embodiments of the present disclosure may be obtained by replacing the CntlData of Version Indication field (5 octets) and CntlData of Feature Response field (8 octets) of the single-device Advertising message of FIG. 14 with a CtrlData of Encryption Request field (22 octets). The multi-device Advertising message according to embodiments of the present disclosure may have a 130-octet AdvData field. Single-device and multi-device Connection Indication messages according to embodiments of the present disclosure may have the same structure.

FIG. 16 illustrates a time required for checking the battery state based on multi-device message formats.

Manufacturers require that the time required for checking the battery state after the BMS is turned on and initialized is within 150 to 400 ms. Referring to FIG. 16, when a wireless connection method for multiple devices according to embodiments of the present disclosure is applied, the time required for checking the battery state is about 60 ms with respect to the 12 slave devices. Here, the 60 ms covers a connection time of 30 ms and a 100-byte transmission and reception time of 30 ms. When the multi-device message formats are used according to an embodiment of the present disclosure, the time required for checking the battery state may be reduced by about 30 ms, compared to when single-device message formats are used (for example, the connection time may be reduced by about 15 ms and the 100-byte transmission and reception time may be reduced by about 15 ms).

3. Connectionless Data Transfer Technology (1) Standard-Based Data Transmission and Reception Operation FIG. 17 (a) illustrates a standard-based connectionless data transfer technology, and FIG. 17 (b) illustrates data formats used for the standard-based connectionless data transfer technology.

Referring to FIG. 17 (a), in the standard-based connectionless data transfer technology, the salve device transmits Advertising data to the master device. Upon receiving the Advertising data, the master device transmits Scan Request data to the slave device. After receiving the Scan Request data, the slave device transmits Scan Response data to the master device.

Referring to FIG. 17 (b), the Advertising data used in the standard-based connectionless data transfer technology may include an AdvA field (6 octets) and a TargetA field (6 octets). The standard-based Scan Request message may include a ScanA field (6 octets) and an AdvA field (6 octets). The standard-based Scan Response message may include an AdvA field (6 octets) and a ScanRspData field (0 to 31 octets).

In the standard-based connectionless data transfer technology, multiple slave devices transmit their Advertising messages to one master device. Thus, multiple Advertising messages may collide with each other, and as a result, interference may occur. Further, since role switching between the master and slave devices is necessary for data transfer therebetween, the data transmission and reception time may increase.

In the standard-based connectionless data transfer technology, since only three frequencies with channel indices 37, 38, and 39 among total 40 frequencies available for Bluetooth are used, collisions between messages are highly likely to occur if multiple devices transmit their Advertising messages. As a result, the reception rate of the Advertising message at a receiver may decrease, thereby degrading the overall reliability.

(2) Flexible Scheduling

FIG. 18 (a) illustrates a connectionless data transfer technology according to an embodiment of the present disclosure, and FIG. 18 (b) illustrates data formats used for the connectionless data transfer technology according to an embodiment of the present disclosure.

According to an embodiment of the present disclosure, the BMC may act as the master device, and the CMC may act as the slave device.

Referring to FIG. 18 (a), the BMC acting as the master device may transmit Advertising data to the CMC acting as the slave device. Upon receiving the Advertising data, the CMC may transmit Scan Request data to the BMC. After receiving the Scan Request data, the BMC may transmit Scan Response data to the CMC.

According to an embodiment of the present disclosure, one master device may transmit Advertising data to multiple slave devices. Thus, collisions between Advertising data may be mitigated, compared to the standard where Advertising data are simultaneously transmitted from a plurality of slave devices, thereby achieving channel interference cancellation.

According to an embodiment of the present disclosure, not only frequency bands with channel indices 37, 38, and 39 but also frequency bands with channel indices 0 to 36 are available, thereby improving the message reception rate.

The BMC may provide transmission scheduling information including information about the frequency and time for next data transmission through the Advertising data. By doing so, flexible scheduling and channel interference cancellation may be performed. According to an embodiment of the present disclosure, data transmission may be performed with no role switching between the master and slave devices, thereby reducing the data transmission and reception time.

Referring to FIG. 18 (b), Advertising data according to an embodiment of the present disclosure may include an AdvA field (6 octets), a TargetA field (6 octets), a NextSchedulingInfo field (2 octets), and an AdvData PDU field (0 to 100 octets). The NextSchedulingInfo field may include a Channel Index field (6 bits), a Clock Accuracy field (1 bit), an Offset Units field (1 bit), and an Offset Value field (8 bits).

The NextSchedulingInfo field may include information about the frequency and time for next Advertising data transmission. A ScanA field may include information on the ID of the slave device receiving the Advertising data. The Channel Index field included in the NextSchedulingInfo field may include information about the frequency for the next Advertising data transmission. The Clock Accuracy field may include the clock accuracy of an advertiser to be used between a packet including the current Advertising data and a packet including the next Advertising data. The Offset Units fields may include information about a unit used for the Offset Value field. The Offset Value field may include information about a time period from the start point of a packet including a payload field to the start time of the next Advertising data packet.

Scan Request data according to an embodiment of the present disclosure may include a ScanA field (6 octets), an AdvA field (6 octets), and a ScanReqData field (0 to 100 octets). Scan Response data according to an embodiment of the present disclosure may include an AdvA field (6 octets) and a TargetA field (6 octets).

The flexible scheduling method according to an embodiment of the present disclosure will be described in detail. For initial Advertising data transmission, frequencies 37, 38, and 39 may be used. For the initial Advertising data transmission, a period of about 6.875 ms may be used with respect to 100 bytes. Regarding next transmission scheduling information included in the initial Advertising data, a next scan frequency may be determined by the Channel Index field, and a next scan start time may be determined by the Offset Value field and Offset Units field.

The transmission and reception period of next data after the initial Advertising data transmission may be about 2.5 ms.

When transmitting proposed Advertising Indication data (ENH_ADV_IND), the master device may update scheduling information (frequency and time). Upon receiving the proposed Advertising Indication data (ENH_ADV_IND), the slave device may apply the scheduling information to a next period.

When the slave device fails in receiving the proposed Advertising Indication data (ENH_ADV_IND), the slave device may maintain previously received frequency information and perform scanning for a specific time.

When the master device fails in receiving proposed Scan Request data (ENH_SCAN_REQ), the master device may maintain previously transmitted frequency information and retransmit the Advertising data suitable for Quality of Service (QoS).

When each of the slave and master devices fails in receiving its desired data for a specific time, each device may perform the initial operation (initial frequency and initial transmission period) after switching to the initial state.

When the master device receives the proposed Scan Request data (ENH_SCAN_REQ), the master device may confirm that the slave device has correctly received data transmitted from the master device. When the slave device receives proposed Scan Response data (ENH_SCAN_RSP), the slave device may confirm that the master device has correctly received data transmitted from the slave device.

FIG. 19 illustrates a data transmission and reception time according to the flexible scheduling method.

Referring to FIG. 19, a time required for transmitting initial scheduling data and a 100-byte data PDU may be about 6.875 ms. A transmission time for each channel index may be about 2204 us. The transmission time for each channel index may include a time required for the master device to transmit the proposed Advertising Indication data (ENH_ADV_IND), receive the proposed Scan Request data (ENH_SCAN_REQ), and transmit the proposed Scan Response data (ENH_SCAN_RSP). A time required for transmitting next scheduling data after transmission of the initial scheduling data is about 2.5 ms.

(3) Fixed Scheduling

The fixed scheduling method according to an embodiment of the present disclosure may refer to a frequency-fixed allocation method in which a total of 40 radio channels are allocated to devices with no overlap for the use of advertising in advance.

Specifically, the master device may use channels 37, 38, and 39. In addition, radio channels 0 to 36 may be uniformly allocated to slave devices with no overlap.

Alternatively, different codes may be used to uniformly allocate the radio channels to slave devices with no overlap.

The data transmission time may be fixed according to the size of data. The frequency and time to be used by the slave device may be provided in advertising.

FIG. 20 (a) illustrates a method of exchanging data with each slave device, and FIG. 20 (b) illustrates a method of exchanging the same data with all slave devices.

Referring to FIG. 20 (a), the master device may transmit Advertising data to one configured slave device based on channel indices 37, 38, and 39. Upon receiving the Advertising data, the slave device may transmit data to the master device based on a frequency and time indicated by the Advertising data.

Referring to FIG. 20 (b), the master device may transmit the same data to a plurality of slave devices based on channel indices 37, 38, and 39. In addition, the slave device may transmit data to the master device based on a frequency and time indicated by the Advertising data.

FIG. 21 illustrates data transmitted from the master device and data transmitted from the slave device according to an embodiment of the present disclosure.

The data transmitted from the master device may include an AdvA field (6 octets), a ChMap field (4 bits), a Length field (4 bits), a Slave List field (variable), and an AdvData field (0 to 100 octets)

The AdvA field may include the device address of the master device. The ChMap field may include the index of a channel to be used among channels allocated to the slave device. The Length field may include information about the length of the Slave List field (variable).

The data transmitted from the slave device may include an AdvA field (6 bytes) and an AdvData field (0 to 100 octets).

The fixed scheduling method according to an embodiment of the present disclosure will be described in detail. The master device may transmit Advertising data at frequencies 37, 38, and 39 for a transmission time of 3.75 ms (1.25 ms*3). The Advertising data may include information about a Slave Advertising frequency, which is determined based on the Slave List field (capable of checking whether data is received) and the ChMap field.

A time required for the role switching between the advertiser and scanner may be about 1.25 ms. A time required for the slave device to transmit an Advertising message may be about 1.25 ms with respect to 100 bytes.

A time at which the slave device transmits the Advertising message may be calculated based on the following information. The Advertising message transmission time of the slave device may be determined based on an Advertising message transmission period of the master device, an Advertising message reception time of the master device, a data transmission period of the slave device, and a salve device list transmitted from the master device.

The slave device may receive an Advertising message transmitted from the master device after a lapse of a predetermined time from the time at which the slave device transmits the Advertising message. This may be determined according to whether other slave devices perform transmission. When the slave device fails in receiving the Advertising message transmitted from the master device, the slave device may attempt data reception in each Advertising message transmission period of the master device. When the slave device is not a transmission target in the slave device list included in the message transmitted from the master device, it may be confirmed that data is correctly received.

In the fixed scheduling method, the frequency and time are fixed, and the role switching between the advertiser and scanner may be performed. In the flexible scheduling method, the frequency and time are adjustable, and there may be no role switching between the advertiser and scanner.

In the fixed scheduling method, a time required for data transmission and reception may be about 88.75 ms. When the same data is transmitted to all slave devices, the time may be about 20 ms. In the flexible scheduling method, a time required for initial data transmission and reception may be about 82.5 ms, and a time required for data transmission and reception after the initial data transmission and reception may be about 30 ms. For reference, a standard-based data reception time may be about 60 ms (=5 ms*12).

The time required for checking the battery state after power is turned on according to embodiments of the present disclosure will be summarized in brief. According to the connection-oriented data transfer technology, when data for a single device is transmitted, the time may be about 90 ms. When data for multiple devices is transmitted, the time may be about 60 ms. On the other hand, according to the connectionless data transfer technology, when the fixed scheduling method is used, the time may be about 88.75 ms. When the flexible scheduling method is used, the time may be about 30 or 82.5 ms.

FIG. 22 illustrates a data transmission and reception time when data is transmitted to each slave device based on the fixed scheduling method.

Referring to FIG. 22, the master device requires about 3.75 ms to transmit data to one configured slave device based on channel indices 37, 38, and 39. In addition, about 1.25 ms are required for the role switching. Slave device 1 requires about 1.25 ms to transmit data based on previously allocated channel index 1 after receiving Advertising data transmitted from the master device. The above process repeats from slave device 1 to slave device 12. Thus, the total required time may be about 88.75 ms.

FIG. 23 illustrates a data transmission and reception time when the same data is transmitted to all slave devices based on the fixed scheduling method.

Referring to FIG. 23, the master device requires about 3.75 ms to transmit data to a plurality of slave devices based on channel indices 37, 38, and 39. In addition, about 1.25 ms are required for the role switching. The plurality of slave devices require 12*1.25 ms=15 ms to transmit data based on predetermined frequencies and times after receiving the data.

Thus, the total required time is about 20 ms. Compared to the standard, the time may be reduced by about 33%.

FIG. 24 illustrates a data transmission and reception time based on the fixed scheduling method.

In FIG. 24, T_ADV denotes an interval at which the master device transmits Advertising data (Advertising packet). T_Sched denotes a time required for the slave device schedules Advertising data. T_DATA denotes an interval at which the slave device transmits data. T_TxDelay denotes a time for which the slave device waits to transmit Advertising data to the master device after receiving the Advertising data.

The master device requires about 936 us to transmit the Advertising data based on channel index 37. A spare time for avoiding interference, T_Margin may be about 314 us. Thus, a total of about 1.25 ms may be required for data transmission based on channel index 37. Further, data transmission based on each of channel indices 38 and 39 may require about 1.25 ms.

Thereafter, T_Sched for the role switching may be about 1.25 ms. Each slave device may require about 1.25 ms to transmit data to the master device.

FIG. 25 illustrates a standard-based data transmission and reception time.

In FIG. 25, a time required to transmit Advertising data to one device and then establish a wireless connection is illustrated.

To achieve these objects and other advantages and in accordance with the purpose of the disclosure, a wireless battery management system for vehicles is provided. The wireless battery management system may include at least one cell module controller (CMC) having a wireless communication module and a battery master controller (BMC) wirelessly connected to the wireless communication module of the at least one CMC and configured to manage the at least one CMC. The BMC may be configured to transmit Advertising data configured for the at least one CMC. The at least one CMC may be configured to transmit Scan Request data to the BMC in response to the configured Advertising data. The BMC may be configured to transmit Scan Response data to the at least one CMC in response to the Scan Request data. The configured Advertising data may include scheduling information for next Advertising data transmission.

The scheduling information may include frequency information and time information for the next Advertising data transmission.

When the BMC receives the Scan Request data, the scheduling information may be updated.

When the BMC does not receive the Scan Request data, the scheduling information may be maintained.

When the BMC does not receive the Scan Request data, the configured Advertising data may be retransmitted.

When the Scan Request data and the Scan Response data are not received within a predetermined period of time, the wireless battery management system for vehicles may be initialized.

The time information may include information about an offset value and an offset unit.

The frequency information may be determined as a channel index.

The frequency information may be determined as any one of channel indices 0 to 36.

In this disclosure, both the apparatus and method have been described. The descriptions of both the apparatus and method may be complementarily applied.

Modules, units, or blocks according to embodiments of the present disclosure may be processors, hardware, and/or software executing a series of processes stored in a memory (or a storage unit). The steps or methods described in the embodiments may be performed by the processors, hardware, and/or software. The methods proposed in the present disclosure may be implemented as code. The code may be written on a processor-readable storage medium and thus may be read by a processor provided by the apparatus according to embodiments of the present disclosure.

It will be understood by those skilled in the art that various modifications and variations can be made without departing from the spirit or scope of the present disclosure. Thus, the present disclosure covers all modifications and variations of the present disclosure provided they come within the scope of the appended claims and their equivalents.

It will be appreciated by those skilled in the art that various modifications and variations can be made without departing from the spirit or scope of the present disclosure. Thus, it is intended that the present disclosure covers all modifications, equivalents, and/or alternatives of the present disclosure provided they come within the scope of the appended claims and their equivalents.

The invention claimed is:

1. A wireless battery management system for vehicles, the wireless battery management system comprising:
    at least one cell module controller (CMC), as a slave device, having a wireless communication module and a battery module; and
    a battery master controller (BMC), as a master device, wirelessly connected to the wireless communication module of the at least one CMC and configured to manage the at least one CMC,
    wherein the BMC is configured to transmit Advertising data configured for the at least one CMC,
    wherein the at least one CMC is configured to transmit Scan Request data to the BMC in response to the configured Advertising data,
    wherein the BMC confirms that the at least one CMC has correctly received the Advertising data,
    wherein the BMC is configured to transmit Scan Response data to the at least one CMC in response to the Scan Request data, and
    wherein the configured Advertising data includes scheduling information for a next Advertising data transmission.

2. The wireless battery management system of claim 1, wherein the scheduling information includes frequency information and time information for the next Advertising data transmission.

3. The wireless battery management system of claim 2, wherein the time information includes information about an offset value and an offset unit.

4. The wireless battery management system of claim 2, wherein the frequency information is determined as a channel index.

5. The wireless battery management system of claim 4, wherein the frequency information is determined as any one of channel indices 0 to 36.

6. The wireless battery management system of claim 1, wherein based on that the BMC receives the Scan Request data, the scheduling information is updated.

7. The wireless battery management system of claim 1, wherein based on that the BMC does not receive the Scan Request data, the scheduling information is maintained.

8. The wireless battery management system of claim 1, wherein based on that the BMC does not receive the Scan Request data, the configured Advertising data is retransmitted.

9. The wireless battery management system of claim 1, wherein based on that the Scan Request data and the Scan Response data are not received within a predetermined period of time, the wireless battery management system for vehicles is initialized.

* * * * *